2,763,627
ACRYLONITRILE POLYMERS MODIFIED WITH AMYLOSE ETHERS

Hugh J. Hagemeyer, Jr., Kingsport, Tenn., assignor to Eastman Kodak Company, Rochester, N. Y., a corporation of New Jersey No Drawing. Application April 1, 1952,
Serial No. 279,911

2 Claims. (Cl. 260—17.4)

This invention relates to acrylonitrile polymers modified with amylose or amylose esters or amylose ethers, and to a process for preparing such modified acrylonitrile polymers.

It is known that polyacrylonitrile fibers, films, etc., can be prepared which have excellent physical properties such as high strength, high sticking temperature and good resistance to shrinkage at elevated temperatures. However, such products show low moisture absorption and poor dyeability with most presently available dyes. For a great many textile purposes improved dyeability of fibers of acrylonitrile, for example, would be highly desirable.

It is known further that greatly increased moisture absorption and dyeability of acrylonitrile fibers can be obtained by copolymerizing acrylonitrile with certain hydrophilic monomers such as acids, amides, esters, etc., which contain an unsaturated ethylenic linkage. The degree of improvement in these properties varies with type and amount of the monomer copolymerized with acrylonitrile. When an amount of modifier has been copolymerized with acrylonitrile sufficient to give desirable moisture absorption and dyeability, it is usually found that the resulting fibers have such low sticking temperatures and high shrinkage at elevated temperatures that they are not suitable for most textile purposes. For example, when acrylonitrile is copolymerized with from 15 to 25 per cent acrylamide, the resulting fibers show good moisture absorption and dyeability, but their sticking temperature is relatively low at about 150° C., and they will shrink about 50 per cent in length in boiling water, whereas polyacrylonitrile fibers with no modifier have a sticking temperature of about 200° C. or higher, and a shrinkage of only about 5 per cent in boiling water. Therefore, loss in these two desirable properties of polyacrylonitrile fibers by copolymerization is usually the case.

The retention of the good properties of polyacrylonitrile by simple admixtures of polyacrylonitrile with other dye-susceptible materials has also been proposed. This procedure likewise has provided certain kinds of fibers and films which have shown good dyeing properties. However, many of these fibers show a low softening point and, in addition, some suffer from poor compatibility in permanence of spinning solutions and in segmentation defects in the spun fibers. For example, it can be demonstrated that simple mixtures of polyacrylonitrile and polyvinyl acetate, when dissolved in either N,N-dimethyl formamide or N,N-dimethyl acetamide in proportions varying from 15 to 50 per cent of polyvinyl acetate, based on the total weight of mixed polymerisates, form grainy dopes which separate into two layers on standing. This is also true of many other polymeric mixtures and is not surprising because of the generally known poor compatibility of polyacrylonitrile with many other polymeric materials. Also fibers from such mixtures as above are susceptible to separation by extraction with various non-solvents for the polyacrylonitrile, or by leaching with the chemicals and solutions employed in the processing of the fibers as in dyeing the fibers, etc.

I have now found that polyacrylonitrile or acrylonitrile polymers containing 70 per cent or more of acrylonitrile can be modified with amylose, amylose esters or amylose ethers to give in the usual solvents for polyacrylonitrile stable, homogeneous solutions which do not separate on standing for several days or more, and from which can be prepared fibers that show good moisture absorption and dyeability, no segmentation defects, no reduction in sticking temperature or increase in shrinkage at elevated temperatures. The modified acrylonitrile polymers of the invention assume the character of a unitary system, i. e., a one component system, since they remain unaffected by extraction with non-solvents for polyacrylonitrile and by leaching action of processing solutions as in fiber preparation and after treatment.

It is, accordingly, an object of the invention to provide resinous, composite polymers comprising acrylonitrile and amylose or esters or ethers of amylose. Another object is to provide stable, homogeneous solutions of these resinous, composite polymers, and fibers, films, etc., prepared from these solutions. Another object is to provide a process for the new resinous, composite polymers. Other objects will become apparent hereinafter.

In accordance with the invention, I prepare my new resinous acrylonitrile polymers by heating in the presence of a peroxide polymerization catalyst a mixture comprising from 70 to 90 parts by weight of acrylonitrile, or from about 68 to 82 parts by weight of acrylonitrile and from about 2 to 8 parts by weight of another polymerizable ethenoid monomer, and from 30 to 10 parts by weight of amylose, an amylose ester or an amylose ether. The product can be isolated, if desired, by coagulation, filtration, washing, etc. Since polyacrylonitrile is highly compatible with amylose and its ester and ether derivatives, excellent compositions of these components, in the above proportions, can also be prepared by mechanical admixture of these components. Suitable other ethenoid monomers include unsaturated esters such as vinyl carboxylic esters (e. g. vinyl acetate, vinyl butyrate, vinyl benzoatel, etc.), isopropenyl carboxylic esters (e. g. isopropenyl acetate, isopropenyl propionate, etc.), and esters of acrylic and methacrylic acids (e. g. methyl acrylate, butyl acrylate, methyl methacrylate, butyl methacrylate, etc.). Suitable amylose compounds include amylose, amylose esters with saturated carboxylic acids (e. g. amylose acetate containing from 1 to 44 per cent acetyl, amylose propionate, amylose butyrate, amylose acetate-propionate, amylose acetate-butyrate, amylose chloroacetate, cyanoethylated partial esters of amylose, sodium acetyl amylose sulfate, etc.) and amylose ethers wherein the ether group contains from 1 to 4 carbon atoms (e. g. methyl amylose, ethyl amylose, cyanoethyl amylose, carboxymethyl amylose, etc.), and similar other organic ester and ether film-forming derivatives of amylose.

The polymerizations for preparing the new resinous, composite polymers of the invention are carried out in emulsion, solution and/or dispersion, preferably in aqueous dispersion, and are accelerated with heat, actinic light and catalysts known to accelerate the polymerization of unsaturates. The temperature employed in the polymerizations can range from about 30° to 100° C., but preferably from about 40° to 80° C. Typical catalysts include the organic and inorganic peroxides such as hydrogen peroxide, benzoyl peroxide, acetyl peroxide, lauroyl peroxide, etc., persulfates such as ammonium persulfate and alkali metal persulfates such as sodium, potassium, etc. persulfates, perborates such as sodium or potassium perborates and ammonium perborate, percarbonates such as sodium or potassium percarbonates, and the like. The quantity of catalyst used can be varied from about 0.01 to 2.0 per cent, based on the weight of acrylonitrile or mentioned mixtures of acrylonitrile with another ethenoid monomer, to be polymerized. An activating agent such as an alkali metal bisulfite (e. g. sodium or potassium bisulfites, etc.) can be used to advantage. Advantageously, the polymerizations are carried out in the presence of a chain regulator such as hexyl, octyl, lauryl, dodecyl mercaptans, etc. A mixture of catalysts can be employed. The products obtained have been found to contain approximately the same proportions of components to be polymerized together as the starting polymerization mixtures.

The use of emulsifying or dispersing agents in the aqeuous polymerization mixtures have also been found advantageous in small amounts, not exceeding about 2 per cent, based on the total weight of reactants, including alkali metal salts of fatty alcohol sulfates (e. g. sodium or potassium lauryl sulfate, etc.), alkali metal salts of aromatic sulfonic acids (e. g. sodium isobutyl naphthalene sulfonate, etc.), ordinary soaps, sulfosuccinic acid esters, their alkali metal salts or amine addition salts, alkali metal salts of fatty acids containing from 12 to 20 carbon atoms, sulfonated fatty acid amides or their alkali metal salts, the complex reaction products obtained by reacting ethylene oxide with aliphatic alcohols, gum arabic, gelatin, etc.

The following examples will serve further to illustrate the resinous compositions of the invention, and the manner of their preparation.

*Example 1*

20 g. of amylose were dissolved in 500 g. of water containing 0.5 g. of ammonium persulfate, 1.0 g. of sodium bisulfite and 0.15 g. of tertiary dodecyl mercaptan. After deaeration with nitrogen, 80 g. of acrylonitrile were added while stirring the water solution. Polymerization began immediately and a temperature of from 43° to 47° C. was maintained for 2 hours by cooling as required. The polymer dispersion was diluted with 300 cc. of water, filtered, washed twice with water and dried at 70° C. A yield of 97% of a fine, white powder of the composite polymer of acrylonitrile and amylose was obtained. The product had an intrinsic viscosity of 1.92. Analysis for nitrogen gave a value of 21.67% by weight, or equivalent to approximately 82% of acrylonitrile in the composite polymer. Solutions of the polymer in N,N-dimethyl formamide were spun by both wet and dry spinning processes to give white, lustrous fibers which had tensile strengths of 4.1–5.3 g./d. (grams per denier) and 12–16% E (elongation), and an excellent affinity for acetate, direct cotton and vat dyes.

*Example 2*

25 g. of partially hydrolyzed amylose acetate (31.2% acetyl) were added to a solution of 10 g. of Aerosol OT (dioctyl sodium sulfosuccinate) in 350 cc. of distilled water and emulsified by stirring at 22°–25° C. for 30 minutes. After sweeping out the system with nitrogen, 75 g. of acrylonitrile, 20 cc. of 3% aqueous potassium persulfate and 0.20 g. of tertiary dodecyl mercaptan were added. Heat was applied and at 35° C. an exothermic reaction started which raised the temperature of the emulsion to 50° C. in 5 minutes. The reaction temperature was held at 48°–50° C. for 30 minutes by cooling, after which the temperature held constant for 2.5 hours with no further heating or cooling necessary. The emulsion was coagulated by pouring it into twice its volume of 2% aqueous sodium chloride, while stirring. The polymer obtained was filtered, washed twice with water and dried to constant weight. Analysis for nitrogen gave a value of 19% which is equivalent to approximately 72% by weight of acrylonitrile in the polymer, the remainder of the polymer being the hydrolyzed amylose acetate. The yield of polymer was about 96%.

A 15% dope of the polymeric product in N-methyl pyrrolidone was spun into an isopropanol bath. The dry fiber was oriented by drafting at 140°–180° C. to form a 5 denier filament fiber having a tensile strength of 5.03 means g./d., an elongation of 16% E, and a good affinity for acetate dyes.

In place of the partially hydrolyzed amylose acetate containing 31.2% of acetyl in the above example, there can be substituted a like amount of a partially hydrolyzed amylose acetate containing from about 5–40% by weight of acetyl to give generally similar polymers, solutions and fibers.

*Example 3*

20 g. of ethyl amylose were suspended in 400 cc. of water containing 1.0 g. of ammonium persulfate, 1.5 g. of sodium bisulfite and 0.25 g. of tertiary dodecyl mercaptan. There were then added 75 g. of acrylonitrile and 5 g. of isopropenyl acetate. Polymerization began at once. A temperature of 55°–60° C. was maintained for 4 hours by cooling and heating as required. The white polymer of acrylonitrile and ethyl amylose was precipitated, washed with water followed by acetone and then air dried. The nitrogen content was 21% by weight or equivalent to approximately 79% of acrylonitrile in the polymer.

A 16.7% dope of the polymer in ethylene carbonate was spun into water and drafted to form a 4 denier per filament fiber. After relaxation, the fiber properties were 4.12 g./d. tensile strength and 26.3% E, and an excellent affinity for acetate dyes.

*Example 4*

A number of examples were prepared, in general, by the processes described in the preceding examples, and these are shown as to proportions, and properties of the resulting fibers, in the following table.

| Composition, percent by weight | | | | Properties of Fibers | | | | |
|---|---|---|---|---|---|---|---|---|
| Modifier | Acrylonitrile | Copolymer | Percent N₂ | G./D. | Percent E | Acetate | Direct Cotton | Vat |
| 25-amylose acetate (39% acetyl) | 75 | 0 | | 4.10 | 16 | Fair | Fair | |
| 20-Amylose diacetate | 80 | 0 | 20.8 | 2.96 | 17.0 | Good | Good | Good. |
| 20-Cyanoethyl amylose | 77 | 3-Isopropenyl acetate | 20.5 | 3.52 | 26.4 | Excellent | Fair | Do. |
| 15-Methyl Amylose | 85 | 0 | | 3.81 | 14.4 | Good | Good | |
| 15-Cyanoethyl amylose diacetate | 85 | 0 | | 4.76 | 12.6 | do | | |
| 15-Amylose Formate | 85 | 0 | | 3.91 | 9.0 | do | Fair | |
| 17-Amylose acetate-lactate | 78 | 5-Isopropenyl acetate | | 2.85 | 29.0 | Excellent | Good | Do. |
| 30-Amylose Acetate (26% acetyl) | 70 | | | 5.36 | 14.9 | do | Excellent | Do. |
| 20-Carboxymethyl amylose | 80 | | | 1.86 | 8.9 | Good | | |
| 17-Sodium acetyl amylose sulfate | 80 | 3-Methyl acrylate | | 2.04 | 11.6 | Fair | Fair | Fair. |

*Example 5*

20 g. of a copolymer of 97 parts by weight of acrylonitrile and 3 parts by weight of isopropenyl acetate was dissolved in 80 g. of dimethyl formamide and the solution added to 5 g. of amylose diacetate dissolved in 50 g. of dimethyl formamide. The mixture was tumbled and heated at 50° C. for 24 hours to produce a smooth, homogeneous dope. The dope was spun into water to give a 40 denier filament fiber which was subjected to a hot air draft using a draft ratio of 9.4. The fiber showed a tensile strength of 3.01 g./d., 19% E and had a good affinity for acetate dyes.

In place of the amylose diacetate in the above example, there can be substituted a like amount of amylose or other amylose derivatives mentioned as suitable such as amylose formate, amylose butyrate, amylose acetate-butyrate, methyl amylose, butyl amylose, and the like, to give similar stable, smooth and homogeneous solutions in dimethyl formamide and similarly excellent fibers. Preparation of mixtures such as the above can be prepared by a modified process comprising first blending the amylose derivative with the arcylonitrile polymer in a ball mill, or grinder, followed by solution in a suitable solvent.

The resinous, composite compositions of the invention, whether made by polymerizing acrylonitrile in the presence of amylose or a derivative of amylose, or by blending of an acrylonitrile polymer with amylose or derivative thereof, are all soluble in one or more of the organic solvents which dissolve polyacrylonitrile including such solvents as N,N-dimethyl formamide, N,N-dimethyl acetamide, N-methyl pyrrolidone, ethylene carbonate, gamma-butyrolactone, etc. Such solutions, in addition to being useful for wet or dry spinning of fibers, are also valuable materials for coating into films, sheets, foils, etc., with or without the presence of added materials such as plasticisers, fillers, coloring materials, lubricants, etc., which are tough and flexible.

What I claim is:

1. A process for preparing resinous compositions consisting of acrylonitrile and a partially hydrolyzed amylose acetate which consists of heating from 70 to 90 parts by weight of acrylonitrile and from 30 to 10 parts by weight of said partially hydrolyzed amylose acetate, in an aqueous reaction medium, under a nitrogen atmosphere, in the presence of a peroxide polymerization catalyst, until the acrylonitrile has polymerized.

2. The product obtained by the process of claim 1.

References Cited in the file of this patent

UNITED STATES PATENTS

| | | |
|---|---|---|
| 2,378,169 | Agre | June 12, 1945 |
| 2,473,929 | Wilson | June 21, 1949 |
| 2,494,517 | Naps | Jan. 10, 1950 |